US010838737B1

(12) United States Patent
Rao

(10) Patent No.: US 10,838,737 B1

(45) Date of Patent: Nov. 17, 2020

(54) RESTORATION OF MEMORY CONTENT TO RESTORE MACHINE STATE

(71) Applicant: American Megatrends International, LLC, Norcross, GA (US)

(72) Inventor: Srinivasan N Rao, Suwanee, GA (US)

(73) Assignee: American Megatrends International, LLC, Norcross, GA (US)

( * ) Notice: Subject to any disclaimer, the term of this patent is extended or adjusted under 35 U.S.C. 154(b) by 191 days.

(21) Appl. No.: 15/693,030

(22) Filed: Aug. 31, 2017

(51) Int. Cl.

| | |
|---|---|
| ***G06F 9/4401*** | (2018.01) |
| ***G06F 3/06*** | (2006.01) |
| ***G06F 1/3203*** | (2019.01) |

(52) U.S. Cl.
CPC ............ *G06F 9/441* (2013.01); *G06F 1/3203* (2013.01); *G06F 3/0604* (2013.01); *G06F 3/0647* (2013.01); *G06F 3/0685* (2013.01)

(58) Field of Classification Search
CPC ...... G06F 9/441; G06F 1/3203; G06F 3/0604; G06F 3/0647; G06F 3/0685
See application file for complete search history.

(56) References Cited

U.S. PATENT DOCUMENTS

2007/0157045 A1* 7/2007 Gu ........................ G06F 9/4418 713/323
2010/0122077 A1* 5/2010 Durham ................ G06F 1/3203 713/100
2010/0125723 A1* 5/2010 Cooper ................ G06F 9/4411 713/1
2010/0241839 A1* 9/2010 Banga ..................... G06F 9/441 713/2
2011/0040958 A1* 2/2011 Liang ...................... G06F 9/441 713/2
2013/0297924 A1* 11/2013 Laue ....................... G06F 9/441 713/2

* cited by examiner

*Primary Examiner* — Jaweed A Abbaszadeh
*Assistant Examiner* — Gayathri Sampath
(74) *Attorney, Agent, or Firm* — Newport IP, LLC; Leonard J. Hope

(57) ABSTRACT

Technologies are disclosed herein for saving data, such as state data, during boot-up of a computer system, such that that data may be retrieved at a later time and restored to its original locations. The data that is stored may be from a shared partition of system memory that is accessible by both firmware services and runtime services, as enabled by an operating system and/or applications running on the computer system. The data may be stored in a partition of the system memory that is only accessible by firmware. In some embodiments, due to the data of the shared partition of the system memory being restored, some functions of the boot-up may not be repeated prior to loading a second operating system on the computer system.

9 Claims, 5 Drawing Sheets

RESTORATION OF MEMORY CONTENT TO RESTORE MACHINE STATE

BACKGROUND

Many computers utilize firmware, such as a universal extensible firmware interface (UEFI), or a basic input/output system (BIOS), when booting up the computer system and entering runtime, where operations of the computer is controlled by or on behalf of an operating system (O/S). The firmware may perform various services during boot-up, after which the system may operate in runtime.

A system may have system memory that may have partitions for firmware-only access and shared partitions that may be accessible by both the firmware and the O/S. Prior to a system booting up and an O/S being launched, the firmware may write data to the partition of system memory that is accessible to both the firmware and the O/S.

When a system is booted up and operating in runtime, the memory that is available to both the firmware and the O/S may be overwritten, at least in part, by the O/S. Thus, if data stored in the partition of memory accessible by both firmware and the O/S during boot-up is needed after boot-up, then that data may no longer be accessible, as it may have been deleted and/or overwritten.

It is with respect to these considerations and others that the disclosure made herein is provided.

SUMMARY

The technologies disclosed herein provide functionality for saving boot-up state data in system memory, and reverting back to that boot-up state data at a later time, such as after booting-up and entering runtime. Through an implementation of the disclosed technologies and mechanisms, firmware for a computer system may store state data at a snapshot point during boot-up, enter runtime with a first operating system (O/S), restore the stored state data and reenter boot-up mode, and then perform boot-up and enter runtime with a second O/S. This operation may allow some services to be performed by the first O/S during runtime, and then also operate in runtime using the second O/S, with the benefit of the services performed by the first O/S.

According to example embodiments, the computer and the firmware executing thereon may perform various boot-up services, at the end of which a snapshot of shared memory (e.g., memory locations that are accessible by both the firmware and the O/S) may be stored in a firmware-only memory partition. The firmware may then exit boot services, load a first O/S, and then run an application in runtime. This application may invoke a system management mode (SMM) by generating a system management interrupt (SMI) to cause the computer to reboot to a second O/S. The memory snapshot may be restored to the shared memory partition, and the second O/S may be loaded, followed by an exit of boot services. At this point, the computer may operate in runtime with the second O/S.

The above-described subject matter may be implemented as a computer-controlled apparatus, a computer-implemented process, a computing system, or as an article of manufacture such as a non-transitory computer-readable storage medium. These and various other features will be understood from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
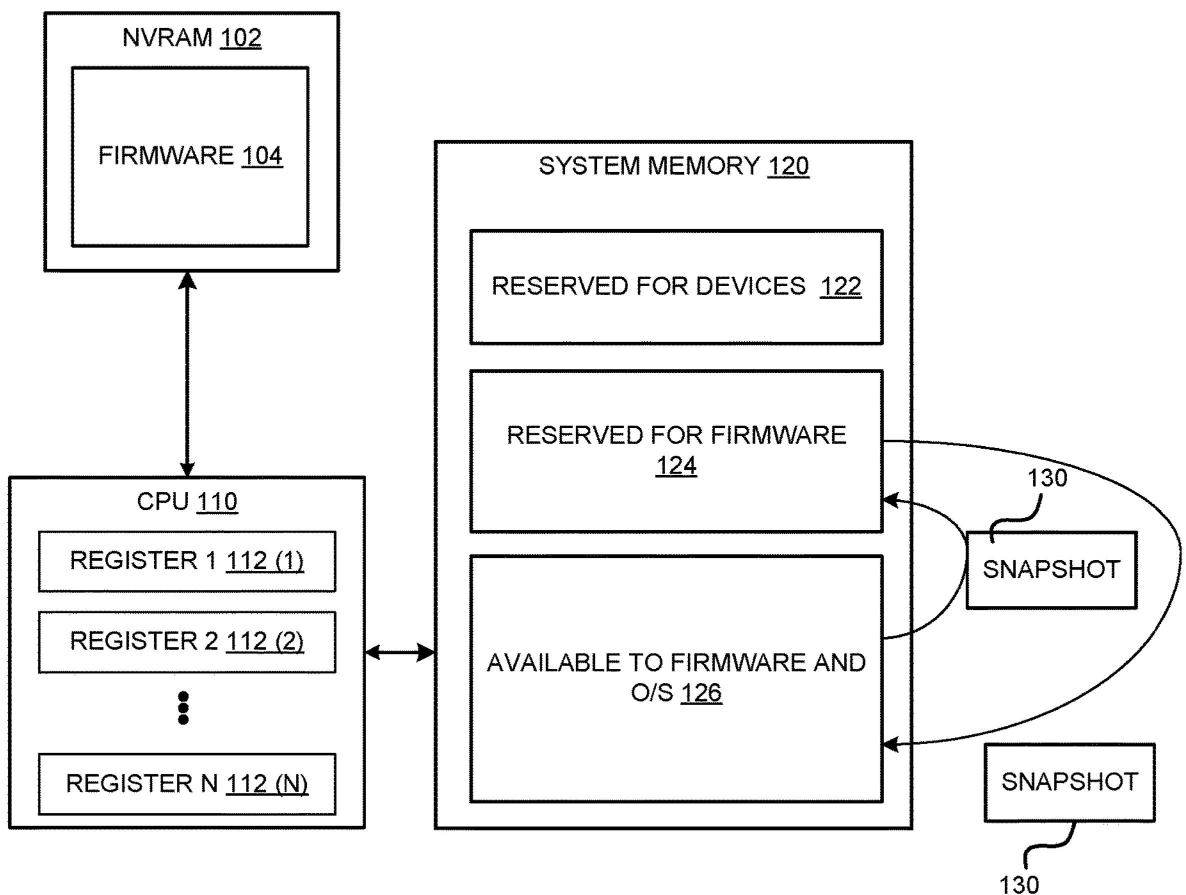
FIG. 1 is a block diagram showing example environment with a firmware that provides boot-up services, with state storage and restoration, according to example embodiments of the disclosure.

The following detailed description is directed to technologies for storing shared memory data in a firmware partition of memory at a particular point during boot-up of a first O/S. When the first O/S is loaded, and the computer system is operating in runtime under the control of the first O/S, one or more applications may be executing on the computer system. One of the applications or the first O/S may generate a suitable system management interrupt (SMI), such as generating and sending a system level interrupt signal, or alternatively by setting a SMI flag. The SMI may invoke entering a system management mode (SMM), where the computer system retrieves the stored data of the shared memory from the previous point in time during the boot-up, as stored in the firmware-only partition of the memory, and initiate loading a second O/S.

The mechanism, as described herein, may be employed to make use of one or more services of a first O/S and then operate in runtime with a different second O/S. For example, one may first boot-up a system using a LINUX kernel, during the boot-up of which, a snapshot of the shared memory may be stored in a firmware-only partition of the memory. Next, an indication (e.g., an SMI) may be received, that the system is to reboot with MICROSOFT WINDOWS as the operating system. At this point the system may enter the SMM, reload the shared memory snapshot from the firmware-only partition of the memory to the shared partition of the memory, and then load MICROSOFT WINDOWS. It will be noted that the discussion in the context of LINUX and WINDOWS™ is non-limiting, and according to example embodiments of the disclosure any suitable O/S may be loaded first, and any other suitable O/S may be loaded after the first O/S.

According to example embodiments, a snapshot of a state of the computer system may be taken during a boot-up of the computer system. This snapshot may include data form a partition of system memory accessible to both firmware and O/S during runtime. In some cases, the state of the computer system, as included in the snapshot, may further include the contents of register(s), cache memory, or indeed any other suitable memory. This snapshot may be stored in a partition of system memory that is only accessible to firmware, for use later on, such as to restore back to the original location of the data.

While the subject matter described herein is presented in the general context of program modules and firmware components that execute in conjunction with the execution of an operating system and application programs on a computer system, those skilled in the art will recognize that other implementations can be performed in combination with other types of program modules.

Generally, program modules include routines, programs, components, data structures, and other types of structures that perform particular tasks or implement particular abstract data types. Moreover, those skilled in the art will appreciate that the subject matter described herein can be practiced with other computer system configurations, including hand-held devices, multiprocessor systems, microprocessor-based or programmable consumer electronics, minicomputers, mainframe computers, and the like.

The subject matter described herein can be practiced in a distributed computing environment where tasks are performed by remote processing devices that are linked through a communications network, and wherein program modules may be located in both local and remote memory storage devices. It should be appreciated, however, that the implementations described herein can also be utilized in conjunction with stand-alone computer systems and other types of computing devices. It should also be appreciated that the embodiments presented herein can be utilized with any type of local area network (LAN) or wide area network (WAN).

In the following detailed description, references are made to the accompanying drawings that form a part hereof, and which are shown by way of illustration specific embodiments or examples. Referring now to the drawings, in which like numerals represent like elements through the several FIGURES, aspects of a computing system and methodology for identifying and resolving dependencies between components in a firmware project will be described.

FIG. 1 is a block diagram showing example environment 100 with a firmware 104 that provides boot-up services, with state storage and restoration, according to example embodiments of the disclosure. The firmware 104, and components thereof, may be stored on non-volatile random access memory (NVRAM) 102, or any other suitable non-volatile memory or storage.

The firmware 104 may be of any suitable type including, but not limited to, basic input/output system (BIOS), extensible firmware interface (EFI), universal extensible firmware interface (UEFI), Open Firmware, combinations thereof, or the like. The firmware 104 and the functionality thereof may be incorporated as part of any suitable computing system including, but not limited to, servers, desktop computers, laptop computers, netbook computers, set-top-boxes, gaming consoles, Wi-Fi routers, smartphones, wearable computers, smart appliances, home automation/control systems, vehicle infotainment systems, combinations thereof, or the like.

The firmware 104 and/or components thereof may enable boot-up services and/or runtime services for computing systems with any suitable type of one or more processors 102 including, but not limited to INTEL ARCHITECTURE (IA) processors from INTEL CORP., processors from ADVANCED MICRO DEVICES (AMD), POWERPC/POWER ARCHITECTURE processors and/or Microcontrollers, ARM PROCESSORS, processors and/or microcontrollers from FUJITSU, ST MICROELECTRONICS, FREESCALE SEMICONDUCTOR, INTERNATIONAL BUSINESS MACHINES (IBM), TEXAS INSTRUMENTS, QUALCOMM, BROADCOM, SAMSUNG, ORACLE CORP./SUN MICROSYSTEMS, any variety of single-core processors, any variety of multi-core processors, central processing units (CPUs), microcontrollers, embedded processors, combinations thereof, or the like. As a non-limiting example, the firmware may be manufactured by PHOENIX TECHNOLOGIES, AMERICAN MEGATRENDS INC., or any other suitable manufacturer of firmware.

According to example embodiments of the disclosure, one or more processors, such as a central processing unit (CPU) 110 may be communicatively coupled to the NVRAM 102 and the firmware 104 provided thereon, such as via a system bus. The CPU 110 may be configured to execute instructions found in the firmware 104, such as within various components of the firmware 104, to perform various boot-up or runtime services. The CPU 110 may have one or more registers 112(1), 112(2), 112(N), hereinafter referred to individually or in plurality as register(s) 112. The registers 112 may store data temporarily on the CPU 110 in relatively close proximity to logic circuits provided on the CPU 110.

The CPU may further be communicatively coupled to system memory 120. The system memory may be any of any suitable type, such as dynamic random access memory (DRAM), static random access memory (SRAM), or the like. The system memory 120 may be of any suitable size (e.g., 4 GB, 8 GB, etc.) and may be used to store data during both boot-up and during runtime. In some example embodiments, data may be stored on the system memory 120 during boot-up that may later be erased when the system 100 enters runtime.

The CPU 110 may be configured to store data to, and read data from, the system memory 120. This data may be read or written by the CPU 100 by providing an address of the system memory location to where the data is to be written, or from where the data is to be read. The CPU 110 may execute instructions as provided by various components or services of the firmware 104 during boot-up or runtime and/or by various runtime software, such as the O/S or other higher-level applications during runtime, to read or write data to the system memory 120.

The system memory 120 may have a partition 122 that is reserved for devices, a partition 124 that is reserved for firmware, and a partition 126 that may be available to firmware and an O/S operating on the system 100. The partition 122 that is reserved for devices may have data written thereto during boot-up by various boot-up services, such as during a driver execution environment (DXE) phase. The partition 124 of system memory reserved for firmware may be written to only by various services and/or utilities of the firmware 104. Writing data or accessing data in the partition 124 of system memory reserved for firmware by the CPU 110 may occur during boot-up or runtime. The partition 126 of the system memory available to the firmware and O/S may be written to, or read from, by the firmware during boot-up or runtime, or by the O/S or other higher-level software during runtime.

During boot-up, components of the firmware 104, as executed by the CPU 110, may store data in the partition 126 of system memory available to the firmware and the O/S. However, that data may be overwritten, deleted, and/or otherwise changed when the system 100 operates in runtime. In other words, during runtime, the firmware 104, O/S, or other higher-level software operating on the CPU 110 may overwrite, or otherwise remove data that was written to the partition 126 of system memory accessible to the firmware and O/S.

According to embodiments of the disclosure, a snapshot 130 of data as stored in the partition 126 of the system memory that is available to both the firmware and the O/S, as written during boot-up by components of the firmware 104 executing on the CPU 110, may be copied to the partition 124 of the system memory reserved for the firmware prior to exiting boot-up. In some example embodiments, the contents of the registers 112 and/or other storage elements (e.g., on-chip cache, on-package cache, etc.) may also be included in the snapshot 130 and stored in system memory partition 124, such that such content can later be restored to its original locations.

After storing the snapshot 130 of memory content from partition 126 to partition 124, the system 100 may load a first O/S, exit boot services, and operate during runtime. In runtime, the contents of partition 126 may be, at least partially, overwritten by data that may be stored during runtime operation of the first O/S or any other higher-level software.

In some example embodiments, one or more services may be performed by the first O/S or one or more applications executed by CPU 110. During runtime under the first O/S, an indication may be generated, such as by the first O/S and/or one or more applications operating on the CPU 110, that causes the CPU 110 to commence rebooting the system 100 under a second O/S. For example, the generated indication may be a system management interrupt (SMI) generated by an application being executed on the CPU 110. The SMI may be any suitable signaling mechanism that invokes the CPU 110 to enter a state and/or mode to commence a reboot under the second O/S. Such an SMI, in example embodiments, may be a system interrupt or setting a system flag. In example embodiments, the SMI may invoke entering a system management mode (SMM), and the CPU 110, while in the SMM, may commence the reboot into runtime under the second O/S.

With the CPU 110 commencing boot-up for operation under the second O/S, the CPU 110 may retrieve and restore the snapshot 130 of data of the shared memory partition 126 from the previous point in time during the boot-up, as stored in the partition 124 of the memory 120 reserved for use by the firmware 104. According to some example embodiments, contents of the registers 112 or other storage elements (e.g., one or more cache memories) may also be restored from the system memory partition 124, where that content may have been stored.

It will be appreciated that certain services that may have been performed on the system 100 during boot-up and/or runtime under the first O/S may be retained on the system 100 while performing the reboot with the second O/S. The CPU 110, after restoring 132 the stored memory to the system memory partition available to both the firmware and the O/S 126, may load the second O/S, exit boot services, and operate in runtime under the second O/S.

Figure 2:
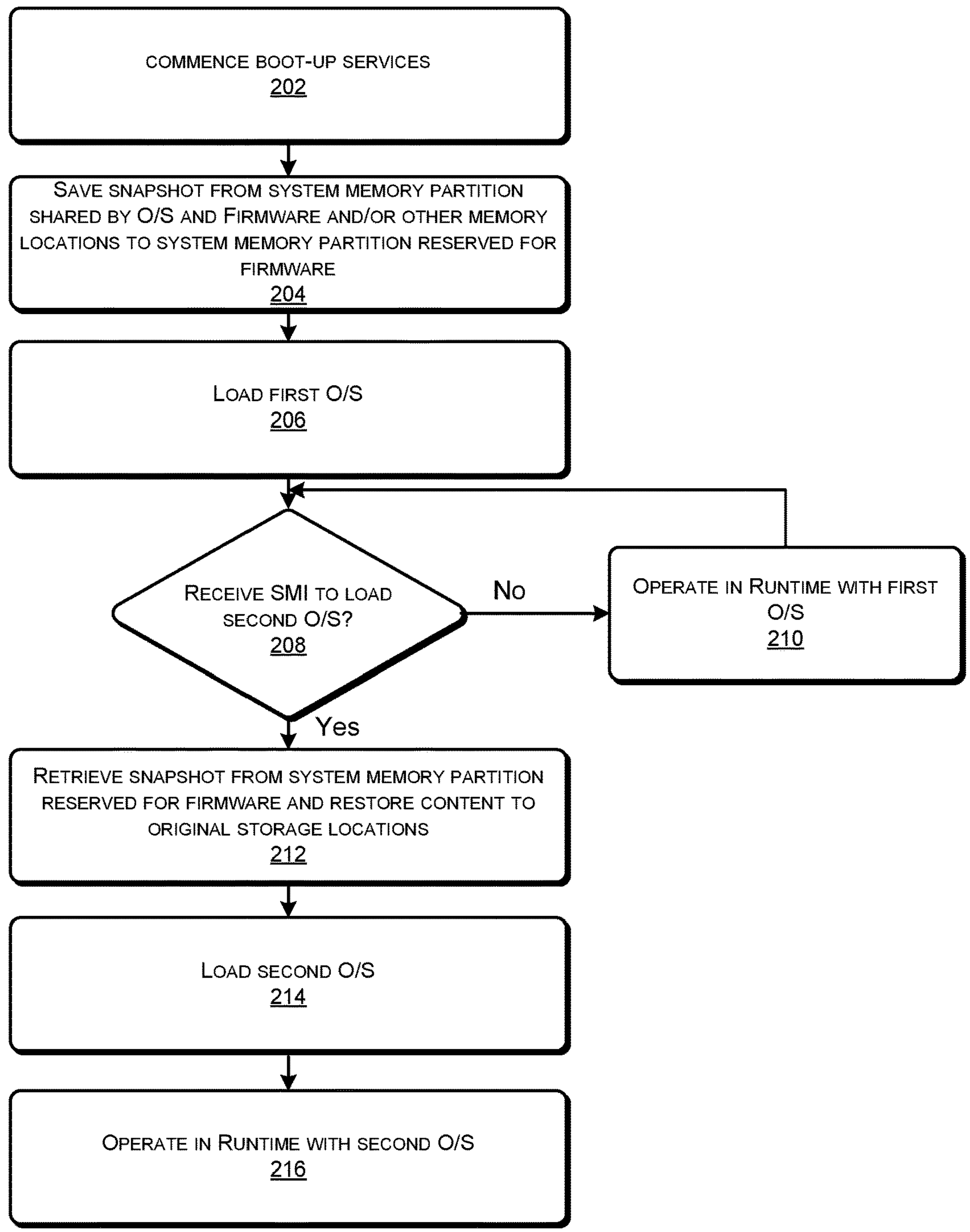
FIG. 2 is a flow diagram illustrating an example method for operating in runtime under either a first O/S or a second O/S, according to example embodiments of the disclosure.

FIG. 2 is a flow diagram illustrating an example method 200 for operating in runtime under either a first O/S or a second O/S, according to example embodiments of the disclosure. The method 200 may be performed on one or more processors, such as the CPU 110, associated with a system 100 incorporating firmware 104, as described herein. The performance of method 200 may be enabled by instructions of any one, or combination of, the firmware 104, an O/S, and/or one or more application programs operating during runtime on the CPU 110.

At block 202, boot-up services may be commenced. The boot-up services may be enabled by the instruction codes of the firmware 104, as executed by the CPU 110. The CPU 110 may perform a variety of functions to enable boot-up of the computing system 100 in which the firmware 104 is incorporated. In some example embodiments where the firmware 104 is a UEFI Specification-compliant firmware, the boot-up functions may include a security phase (SEC), a pre-extensible firmware interface initialization (PEI) phase, a driver execution environment (DXE) phase, a boot device select (BDS) phase, and an operating system loader (O/S Loader) phase. In other example embodiments according to the disclosure, there may be fewer, additional, and/or subdivisions of the aforementioned phases of the boot-up services.

During each of the SEC phase, PEI phase, DXE phase, and BDS phase various functions of booting up the system 100 may be performed by the CPU 110. While performing these services, data associated with each of these services may be stored on various parts of system memory. Some data may be stored in the partition 124 reserved for use by the firmware 104, other data may be stored in the shared partition 126 available to both the firmware and the O/S, and other data may be stored in the registers 112 or other storage locations.

At block 204, during the boot-up, a snapshot 130 from the partition 126 of system memory 120 shared by O/S and firmware 104 and/or other memory locations may be saved in the partition 124 of system memory 120 reserved for the firmware 104. This may entail recording the addresses within the shared partition of system memory from where each of the data elements originated, so that this information may be used to later restore each data element back to the same location from which it was copied in the shared partition of the system memory.

In some other cases, the data may be copied to the partition 124 of the system memory reserved for only the firmware 104 in the same order as the order in the partition 126 of the system memory 120 shared by the O/S and firmware 104, so that that order may be used to later restore each data element to the same location in the partition 126 of system memory from which it was copied. As discussed above, in some cases, other data stores that may be overwritten during runtime (e.g., CPU registers, cache memory, etc.) may also be copied and stored in partitions 124 of the system memory 120 that are reserved for firmware 104.

At block 206, the first O/S may be loaded. Upon the O/S loader phase loading the O/S, the system 100 having the firmware 104 may be in runtime under the control of the first O/S (e.g., MICROSOFT WINDOWS, REDHAT LINUX, etc.). The first O/S or other applications running on the CPU 110 may store data in the partition 126 of system memory, and possibly overwriting content in the shared partition of memory that was written there during the boot-up of the system. However, as described above with regard to block 204, a copy of the content from the shared partition 126 of the system memory 120 prior to loading the first O/S has previously been stored in the partition 124 of the system memory 120 reserved for access by the firmware 104.

At block 208, it may be determined if an SMI is received that indicates that a second O/S is to be loaded. The SMI may be an interrupt that is initiates an SMM. In some example embodiments, the SMI may be generated by the CPU 110 by executing instructions of an application running on the system 100. The generation of the SMI by the application, in some cases, may be responsive to input from a user of the system 100.

If an SMI, or any other suitable indication of rebooting to a second O/S is not received, then at block 210, the system 100 may operate under the first O/S. If, however, at block 208, an SMI is received that indicates that the system is to reboot to a second O/S, then at block 212, the saved snapshot content may be retrieved from the partition 124 of system memory 120 reserved for firmware 104 and the content may be written back to the partition 126 of the system memory 120 shared by the O/S and the firmware 104. In some cases, other stored content (e.g., CPU register values, cache memory content, etc.) may also be restored to their previously stored states.

At block 214, the second O/S may be loaded. It will be appreciated that not all of the processes of boot-up need be replicated when loading the second O/S, because the state information from that process is restored according to the methods, systems, and computer-readable memory, as described herein. For example, the second O/S may be loaded without having to reperform the procedures of the SEC phase, PEI phase, DXE phase, and/or BDS phase. At block 216, the system may operate in runtime under the second O/S.

Figure 3:
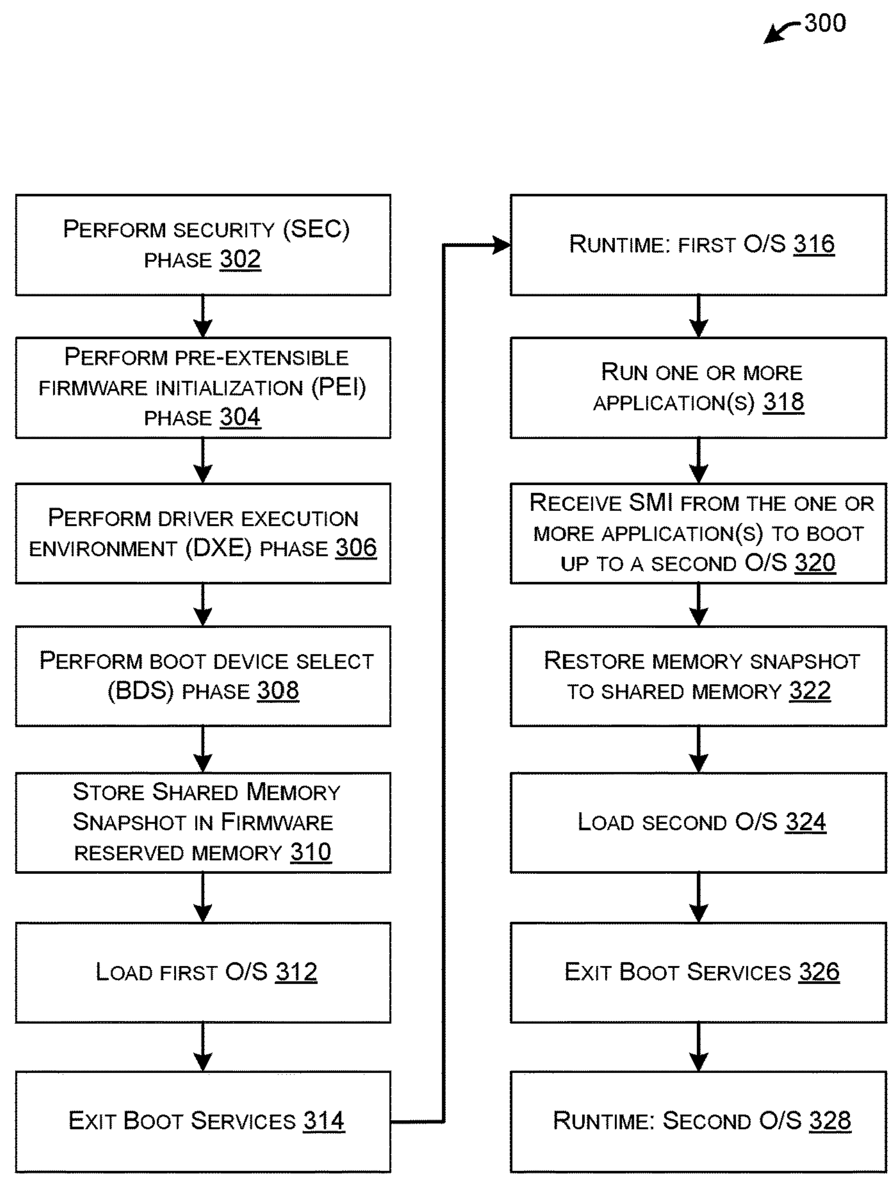
FIG. 3 is flow diagram illustrating an example method, according to example embodiments of the disclosure.

FIG. 3 is flow diagram illustrating an example method, according to example embodiments of the disclosure. The method 300 may be performed on one or more processors, such as the CPU 110 associated with a system 100 incorporating firmware 104, as described herein.

At block 302, the security phase (SEC) operations may be performed. This phase may be at the lowest level of hardware interaction to initialize the system and pass control to the PEI phase. At block 304, the pre-extensible firmware interface initialization (PEI) phase 112 may be performed. During the PEI phase, various system configurations may be set and then control may be passed to DXE services.

At block 306, a driver execution environment (DXE) phase may be performed. During the DXE phase 114, a variety of drivers may be loaded, and control may be passed onto the BDS phase. At block 308, boot device select (BDS) phase may be performed. During the BDS phase, connection to the boot device(s) for loading the first O/S may be established. During each of the SEC phase, PEI phase, DXE phase, and BDS phase various functions of booting up the system 100 may be performed and data may be stored in both of the firmware-only partition of system memory, as well as the shared partition of the system memory.

At block 310, a snapshot of the shared memory may be stored in the firmware-only partition of the system memory. The firmware-only accessible partition of the system memory may have sufficient capacity to store the snapshot. In example embodiments, only data that is saved on the shared partition of system memory may be stored on the firmware-only partition of the system memory, rather than mirroring all of the shared partition of the system memory along with empty data elements.

At block 312, the first O/S may be loaded. The first O/S may be any suitable O/S, such as LINUX, MICROSOFT WINDOWS, APPLE OSX, or the like. At block 314, boot services may be exited, at which point, at block 316, the system may operate in runtime under the first O/S. At block 318, one or more application(s) may execute on the system. At block 320, at least one of the one or more application(s) and/or the first O/S may cause an SMI that indicates that the system is to boot-up to a second O/S.

At block 322, the memory snapshot may be restored to the shared memory partition of system memory from where it was copied. In some cases, where the CPU register(s) 112 and/or cache memory were stored during the operations of block 310, then that data may also be restored to its original location(s). At block 324, the second O/S may be loaded. This process may be similar to the operations of block 312, but with a different operating system than in block 312. It should be noted that the second O/S may be booted up without repeating various boot-up operations such as SEC, PEI, DXE, and/or BDS. At block 326, boot services may be exited, and the system may operate in runtime under the second O/S.

Figure 4:
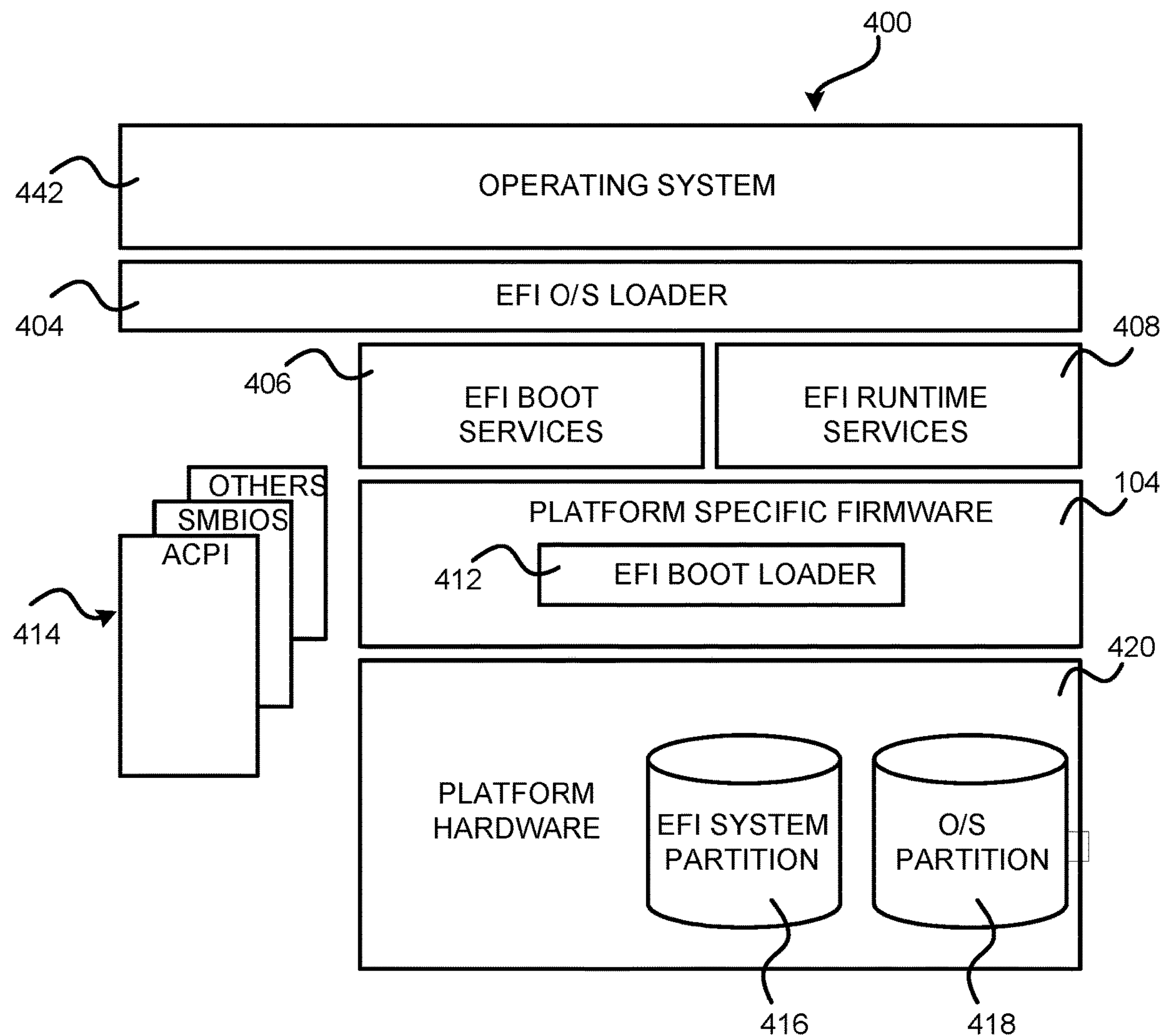
FIG. 4 is a software architecture diagram illustrating an example software architecture for a universal extensible firmware interface (UEFI)-compliant firmware that provides an operating environment for the technologies presented herein, according to example embodiments of the disclosure.

As shown in FIG. 4, the architecture can include platform hardware 420 and an operating system 442. The operating system (O/S) image can be retrieved from the UEFI system partition 416 using an UEFI operating system loader 404. The UEFI system partition 416 can be an architecturally shareable system partition. As such, the UEFI system partition 416 can define a partition and file system designed to support safe sharing of mass storage between multiple vendors. An O/S partition 418 can also be utilized.

Once started, the UEFI O/S loader 404 can continue to boot the complete operating system 402. In doing so, the UEFI O/S loader 404 can use UEFI boot services 406, an interface to other supported specifications to survey, comprehend, and initialize the various platform components and the operating system software that manages them. Thus, interfaces 414 from other specifications can also be present on the system. For example, the Advanced Configuration and Power Management Interface (ACPI) and the System Management BIOS (SMBIOS) specifications can be supported.

UEFI boot services 406 can provide interfaces for devices and system functionality used during boot time. UEFI runtime services 408 can also be available to the UEFI O/S loader 404 during the boot phase. For example, a set of runtime services can be presented to ensure appropriate abstraction of base platform hardware resources used by the operating system 402 during its operation. UEFI allows extension of platform firmware by loading UEFI driver and UEFI application images which, when loaded, have access to UEFI-defined runtime and boot services.

Additional details regarding the operation and architecture of a UEFI Specification compliant firmware can be found in the UEFI Specification which is available from INTEL CORPORATION. INTEL CORPORATION has also provided further details regarding recommended implementation of EFI and UEFI in the form of The INTEL Platform Innovation Framework for EFI (the Framework). Unlike the UEFI Specification, which focuses only on programmatic interfaces for the interactions between the operating system and system firmware, the Framework is a group of specifications that together describe a firmware implementation that has been designed to perform the full range of operations that are required to initialize the platform from power on through transfer of control to the operating system. Both the UEFI Specification and the specifications that make up the Framework, which are also available from INTEL CORPORATION, are expressly incorporated herein by reference.

Figure 5:
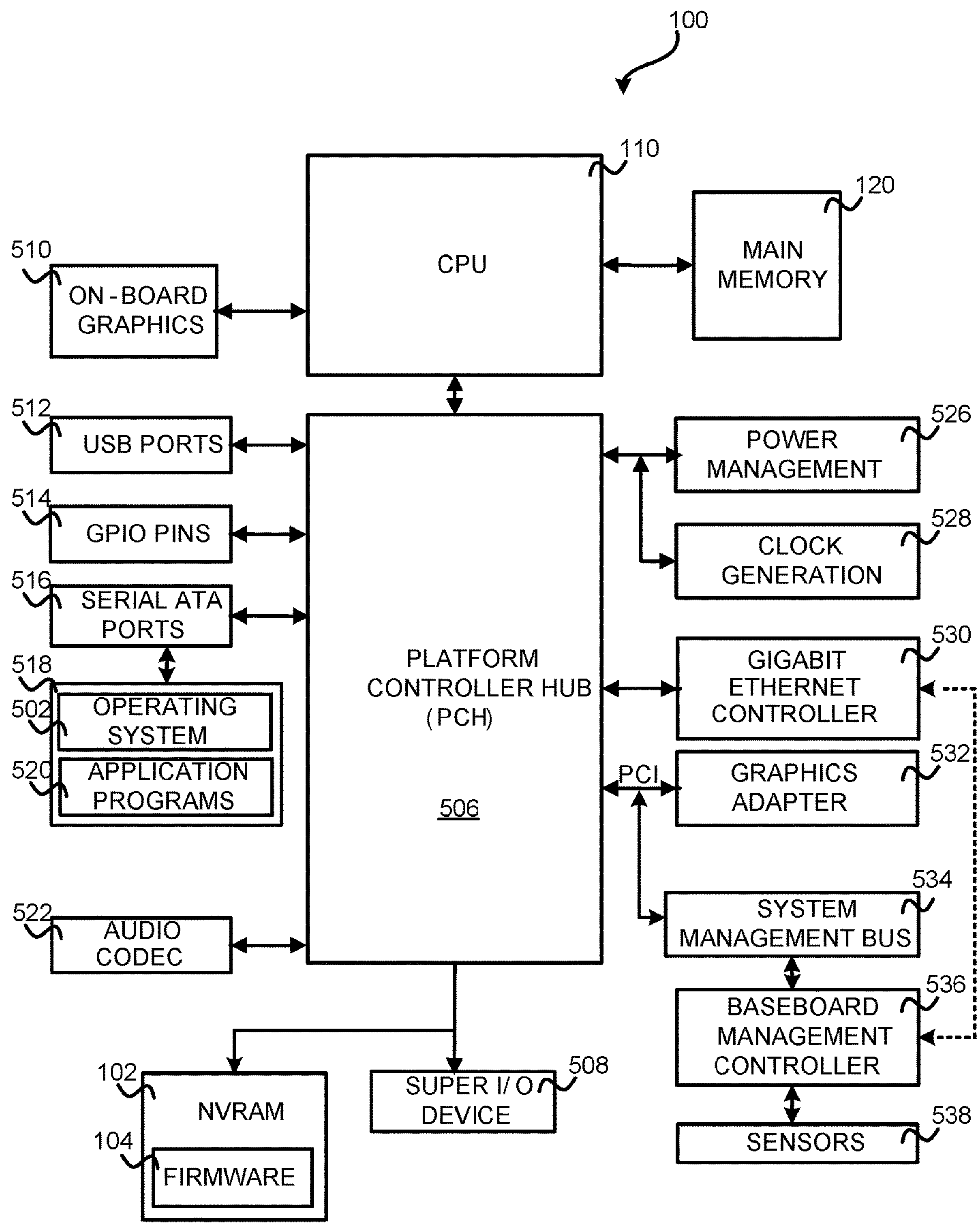
FIG. 5 is a computer architecture diagram that shows an illustrative architecture for a computer that can provide an operating environment for the technologies disclosed herein, according to example embodiments of the disclosure.

Referring now to FIG. 5, a computer architecture diagram that illustrates an illustrative architecture 100 for a computer that can provide an illustrative operative environment for the technologies presented herein will be described. FIG. 5 and the following discussion are intended to provide a brief, general description of a suitable computing environment in which the configurations described herein can be implemented. While the technical details are presented herein in the general context of program modules that execute in conjunction with the execution of an operating system, those skilled in the art will recognize that the configurations can also be implemented in combination with other program modules.

Generally, program modules include routines, programs, components, data structures, and other types of structures that perform particular tasks or implement particular abstract data types. Moreover, those skilled in the art will appreciate that the configurations described herein can be practiced with other computer system configurations, including hand-held devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 5 shows an illustrative computer architecture for a computer 100 that can be utilized in the implementations described herein. The illustrative computer architecture shown in FIG. 5 is for the computer 100 that includes a baseboard, or motherboard, which is a printed circuit board to which a multitude of components or devices can be connected by way of a system bus or other electrical communication path. In one illustrative configuration, a central processing unit (CPU) 110 operates in conjunction with a Platform Controller Hub (PCH) 506. The CPU 110 is a central processor that performs arithmetic and logical operations necessary for the operation of the computer 100. The computer 100 can include a multitude of CPUs 110. Each CPU 110 might include multiple processing cores.

The CPU 110 provides an interface to a random access memory (RAM) used as the main memory 120 in the computer 100 and, possibly, to an on-board graphics adapter 532. The PCH 506 provides an interface between the CPU 110 and the remainder of the computer 100.

The PCH 506 can also be responsible for controlling many of the input/output functions of the computer 100. In particular, the PCH 506 can provide one or more universal serial bus (USB) ports 512, an audio codec 522, a Gigabit Ethernet Controller 630, and one or more general purpose input/output (GPIO) pins 614. The USB ports 512 can include USB 2.0 ports, USB 3.0 ports and USB 3.1 ports among other USB ports. The audio codec 522 can include Intel High Definition Audio, Audio Codec '97 (AC'97) and Dolby TrueHD among others.

The PCH 506 can also include functionality for providing networking functionality through a Gigabit Ethernet Controller 530. The Gigabit Ethernet Controller 530 is capable of connecting the computer 100 to another computer via a network. Connections which can be made by the Gigabit Ethernet Controller 530 can include LAN or WAN connections. LAN and WAN networking environments are commonplace in offices, enterprise-wide computer networks, intranets, and the Internet.

The PCH 506 can also provide a bus for interfacing peripheral card devices such as a graphics adapter 532. In one configuration, the bus comprises a PCI bus. The PCI bus can include a Peripheral Component Interconnect (PCI) bus, a Peripheral Component Interconnect eXtended (PCI-X) bus and a Peripheral Component Interconnect Express (PCIe) bus among others.

The PCH 506 can also provide a system management bus 534 for use in managing the various components of the computer 100. Additional details regarding the operation of the system management bus 534 and its connected components are provided below. Power management circuitry 526 and clock generation circuitry 528 can also be utilized during the operation of the PCH 506.

The PCH 506 is also configured to provide one or more interfaces for connecting mass storage devices to the computer 100. For instance, according to a configuration, the PCH 506 includes a serial advanced technology attachment (SATA) adapter for providing one or more serial ATA ports 516. The serial ATA ports 516 can be connected to one or more mass storage devices storing an O/S, such as O/S 502 and application programs, such as a SATA disk drive 518. As known to those skilled in the art, an OS comprises a set of programs that control operations of a computer and allocation of resources. An application program is software that runs on top of the operating system software 502, or other runtime environment, and uses computer resources to perform application specific tasks desired by the user.

According to one configuration, the O/S 502 comprises the LINUX operating system. According to another configuration, the O/S 502 comprises the WINDOWS operating system from MICROSOFT CORPORATION. According to another configuration, the O/S 502 comprises the UNIX operating system. It should be appreciated that other operating systems can also be utilized.

The mass storage devices connected to the PCH 506, and their associated computer-readable storage media, provide non-volatile storage for the computer 100. Although the description of computer-readable storage media contained herein refers to a mass storage device, such as a hard disk or CD-ROM drive, it should be appreciated by those skilled in the art that computer-readable storage media can be any available media that can be accessed by the computer 100.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer 100.

A low pin count (LPC) interface can also be provided by the PCH 506 for connecting a Super I/O device 508. The Super I/O device 508 is responsible for providing a number of input/output ports, including a keyboard port, a mouse port, a serial interface, a parallel port, and other types of input/output ports. The LPC interface can also connect a computer storage media such as a ROM or a flash memory such as a NVRAM 102 for storing firmware 104 that includes program code containing the basic routines that help to start up the computer 100 and to transfer information between elements within the computer 100. The firmware 104 can be a multi-platform firmware.

It should be appreciated that the program modules disclosed herein, including the firmware 104, can include software instructions that, when loaded into the CPU 110 and executed, transform a general-purpose computer 100 into a special-purpose computer 100 customized to facilitate all, or part of, the operations disclosed herein. As detailed throughout this description, the program modules can provide various tools or techniques by which the computer 100 can participate within the overall systems or operating environments using the components, logic flows, and/or data structures discussed herein.

The CPU 110 can be constructed from any number of transistors or other circuit elements, which can individually or collectively assume any number of states. More specifically, the CPU 110 can operate as a state machine or finite-state machine. Such a machine can be transformed to a second machine, or a specific machine, by loading executable instructions contained within the program modules. These computer-executable instructions can transform the CPU 110 by specifying how the CPU 110 transitions between states, thereby transforming the transistors or other circuit elements constituting the CPU 110 from a first machine to a second machine, wherein the second machine can be specifically configured to perform the operations disclosed herein. The states of either machine can also be transformed by receiving input from one or more user input devices, network interfaces (such as the Gigabit Ethernet Controller 530), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include, but are not limited to the technology used to implement the storage media, whether the storage media are characterized as primary or secondary storage, and the like. For example, if the storage media are implemented as semiconductor-based memory, the program modules can transform the physical state of the semiconductor main memory 120 and/or NVRAM 102. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described briefly above, the PCH 506 can include a system management bus 534. The system management bus 534 can include a Baseboard Management Controller (BMC) 536. In general, the BMC 536 is a microcontroller that monitors operation of the computer 100. In a more specific configuration, the BMC 536 monitors health-related aspects associated with the computer 100, such as, but not limited to, the temperature of one or more components of the computer 100, speed of rotational components (e.g., spindle motor, CPU fan, etc.) within the computer 100, the voltage across or applied to one or more components within the computer 100, and the available and/or used capacity of memory devices within the computer 100. To accomplish these monitoring functions, the BMC 536 is communicatively connected to one or more components by way of the system management bus 534.

In one configuration, these components include sensor devices 538 for measuring various operating and performance-related parameters within the computer 100. The sensor devices 538 can be either hardware or software based components configured or programmed to measure or detect one or more of the various operating and performance-related parameters.

The BMC 536 functions as the master on the system management bus 534 in most circumstances, but can also function as either a master or a slave in other circumstances. Each of the various components communicatively connected to the BMC 536 by way of the system management bus 534 is addressed using a slave address. The system management bus 534 is used by the BMC 536 to request and/or receive various operating and performance-related parameters from one or more components, which are also communicatively connected to the system management bus 534.

It should be appreciated that the functionality provided by the computer 100 can be provided by other types of computing devices, including hand-held computers, embedded computer systems, personal digital assistants, and other types of computing devices known to those skilled in the art. It is also contemplated that the computer 100 might not include all of the components shown in FIG. 5, can include other components that are not explicitly shown in FIG. 5, or might utilize an architecture completely different than that shown in FIG. 5.

Although the subject matter presented herein has been described in language specific to computer structural features, methodological acts, and computer readable media, it is to be understood that the present disclosure is not necessarily limited to the specific features, acts, or media described herein. Rather, the specific features, acts and mediums are disclosed as example forms.

Although the methods as described with reference to the flow diagram illustrated in FIGS. 2 and 3, many other operations for performing the acts associated with the methods may be used. For example, the order of the operations may be changed, some of the operations described may be optional, and additional operations may be included, in accordance with example embodiments of the disclosure.

The subject matter described above is provided by way of illustration only and should not be construed as limiting. Various modifications and changes can be made to the subject matter described herein without following the example configurations and applications illustrated and described, and without departing from the true spirit and scope of the present invention.

What is claimed is:

1. A computer-implemented method, comprising:

during boot-up of a computing device, executing at least a portion of a firmware on the computing device, wherein the portion of the firmware comprises one or more of a security phase, a pre-extensible firmware interface initialization phase, a driver execution environment phase, or a boot device select phase, and wherein the portion of the firmware is configured to store data in a partition of a system memory accessible to the firmware, to a first operating system, and to a second operating system;

prior to completing the boot-up of the computing device, copying the data from the partition of the system memory accessible to the firmware, to the first operating system, and to the second operating system to a partition of the system memory accessible only to the firmware;

booting the computing device to the first operating system;

receiving a request to reboot the computing device to the second operating system; and responsive to the request to reboot to the second operating system, retrieving the data from the partition of the system memory accessible only to the firmware, and storing the data in the partition of the system memory accessible to the firmware, to the first operating system, and to the second operating system, and rebooting the computing device to the second operating system without re-executing the portion of the firmware.

2. The method of claim 1, further comprising:

executing an application on the second operating system, wherein the application is configured to generate the request to reboot to the second operating system by generating a system management interrupt.

3. The method of claim 1, further comprising:

prior to completing the boot-up of the computing device, storing data from one or more registers in the partition of the system memory accessible only to the firmware; and responsive to the request to reboot to the second operating system, restoring the data from the one or more registers from the partition of the system memory accessible only to the firmware to the one or more registers.

4. The method of claim 1, wherein copying the data from the partition of system memory accessible to the firmware, to the first operating system, and to the second operating system to the partition of system memory accessible only to the firmware comprises recording memory addresses for individual data elements of the data within the partition of the system memory accessible to the firmware to the first operating system, and to the second operating system, and wherein storing the data in the partition of system memory accessible to the firmware, to the first operating system, and to the second operating system comprises storing the individual data elements at the same memory address from which the individual data elements were copied using the recorded memory addresses.

5. A computing device, comprising:

at least one processor; and a computer-readable storage medium having instructions stored thereupon that are executable by the processor and which, when executed by the processor, cause the processor to:

during boot-up of the computing device, execute at least a portion of a firmware comprising one or more of a security phase, a pre-extensible firmware interface initialization phase, a driver execution environment phase, or a boot device select phase, wherein the portion of the firmware is configured to store data in a partition of a system memory accessible to the firmware, to a first operating system, and to a second operating system;

prior to completing the boot-up of the computing device, copy the data from the partition of the system memory accessible to the firmware, to the first operating system, and to the second operating system to a partition of the system memory accessible only to the firmware;

boot the computing device to the first operating system;

receive a request to reboot the computing device to a second operating system; and responsive to the request to reboot to the second operating system, retrieve the data from the partition of the system memory accessible only to the firmware and store the data in the partition of the system memory accessible to the firmware, to the first operating system, and to the second operating system, and reboot the computing device to the second operating system without re-executing the portion of the firmware.

6. The computing device of claim 5, wherein the computer-readable storage medium has further instructions stored thereupon to:

execute an application on the first operating system, wherein the application is configured to generate the request to reboot to the second operating system by generating a system management interrupt.

7. The computing device of claim 5, wherein the computer-readable storage medium has further instructions stored thereupon to:

prior to completing the boot-up of the computing device, store data from one or more registers in the partition of the system memory accessible only to the firmware; and responsive to the request to reboot to the second operating system, restore the data from the one or more registers from the partition of the system memory accessible only to the firmware to the one or more registers.

8. A non-transitory computer-readable storage medium having instructions stored thereupon which, when executed by a processor of a computing device, cause the processor to:

during boot-up of the computing device, execute at least a portion of a firmware comprising one or more of a security phase, a pre-extensible firmware interface initialization phase, a driver execution environment phase, or a boot device select phase, wherein the portion of the firmware is configured to store data in a partition of a system memory accessible to the firmware, to a first operating system, and to a second operating system;

prior to completing the boot-up of the computing device, copy the data from the partition of the system memory accessible to the firmware, to the first operating system, and to the second operating system to a partition of the system memory accessible only to the firmware;

boot the computing device to the first operating system; and responsive to a request to reboot the computing device to a second operating system, retrieve the data from the partition of the system memory accessible only to the firmware, store the data in the partition of system memory accessible to the firmware, to the first operating system, and to the second operating system, and reboot the computing device to the second operating system without re-executing the portion of the firmware.

9. The non-transitory computer-readable storage medium of claim 8, having further instructions stored thereupon to:

execute an application on the first operating system, wherein the application is configured to generate the request to reboot the computing device to the second operating system by generating a system management interrupt.

* * * * *